United States Patent [19]

Sahm et al.

[11] Patent Number: 5,935,183
[45] Date of Patent: Aug. 10, 1999

[54] METHOD AND SYSTEM FOR DETERMINING THE RELATIONSHIP BETWEEN A LASER PLANE AND AN EXTERNAL COORDINATE SYSTEM

[75] Inventors: William C. Sahm; Gregory R. Harrod, both of Peoria, Ill.

[73] Assignee: Caterpillar Inc., Peoria, Ill.

[21] Appl. No.: 08/650,748

[22] Filed: May 20, 1996

[51] Int. Cl.⁶ .............................. G06F 7/70; G06F 19/00
[52] U.S. Cl. .................... 701/50; 701/49; 172/4.5
[58] Field of Search .................. 701/49–50, 213, 701/214, 215, 216; 37/347–348; 342/357; 172/4.5, 1, 9

[56] References Cited

U.S. PATENT DOCUMENTS

| | | | |
|---|---|---|---|
| 4,807,131 | 2/1989 | Clegg | 701/50 |
| 5,065,326 | 11/1991 | Sahm | 701/50 |
| 5,233,357 | 8/1993 | Ingensand et al. | 342/352 |
| 5,404,661 | 4/1995 | Sahm et al. | 701/50 |
| 5,612,864 | 3/1997 | Henderson | 701/50 |

FOREIGN PATENT DOCUMENTS 9501575  1/1995  WIPO .

OTHER PUBLICATIONS

Application No. 08/492,644 filed Jun. 20, 1995 "Slope of Cut Control System".

Application No. 08/493,188 filed Jun. 20, 1995 "Apparatus and Method for Determining the Position of a Work Implement".

*Primary Examiner*—William A. Cuchlinski, Jr.
*Assistant Examiner*—Gertrude Arthur
*Attorney, Agent, or Firm*—James R. Yee; William Bryan McPherson

[57] ABSTRACT

A method and system to determine the relationship between a laser plane and an external coordinate system using a mobile machine with a work implement is provided. The laser plane is intersected at three points by a laser receiver installed on a mast attached to the work implement. A position determining antenna located a known distance on the mast from the laser receiver is used to determine external coordinates at the position determining antenna point. An equation for the laser plane in external coordinate terms is determined based on the three external position coordinates and the known distance between the external coordinate system plane and the laser plane.

10 Claims, 7 Drawing Sheets

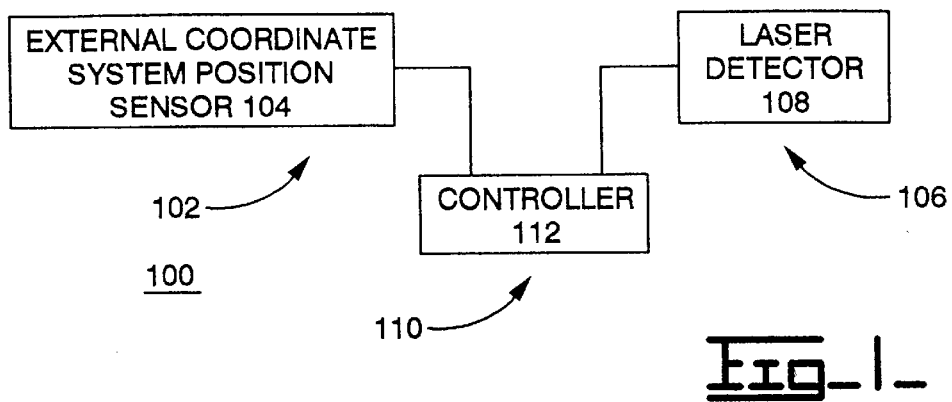
Fig-1-
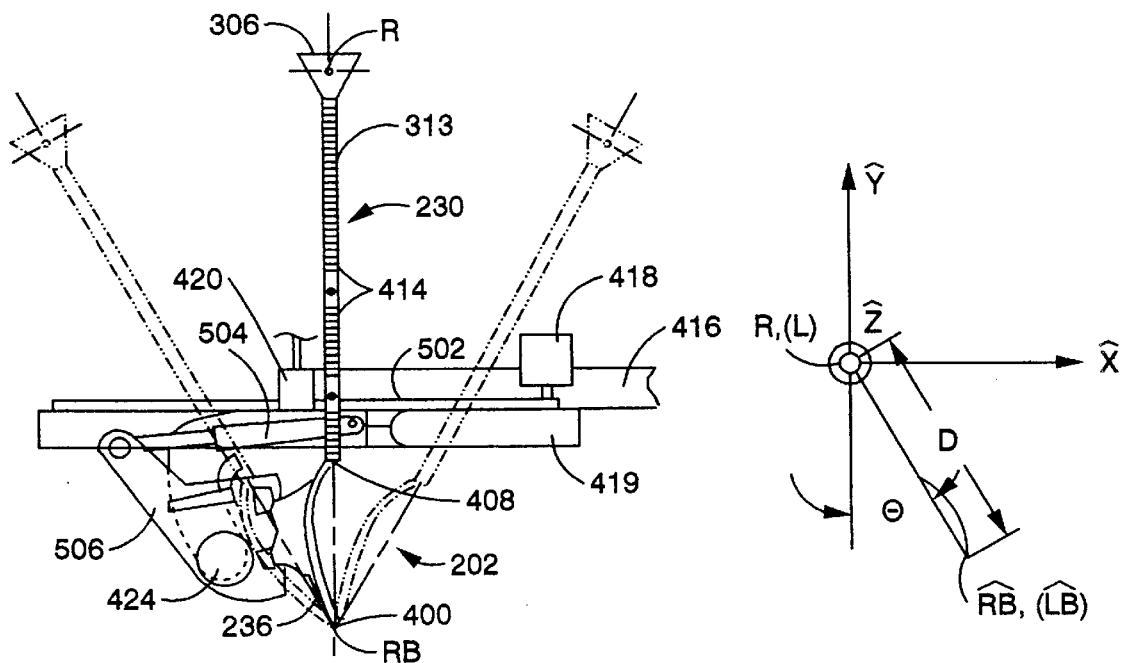
Fig-5-
Fig-6-

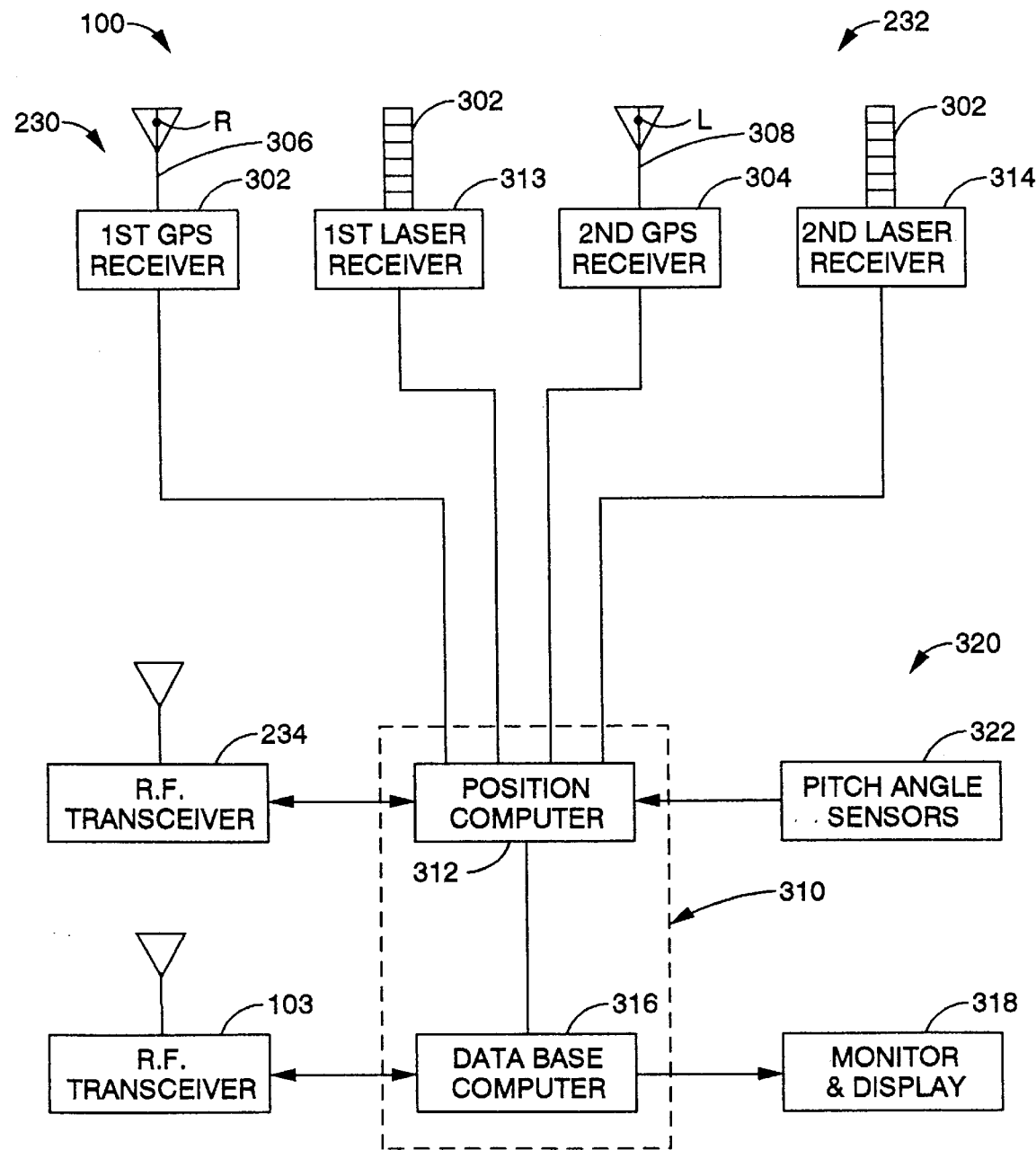
Fig_3_

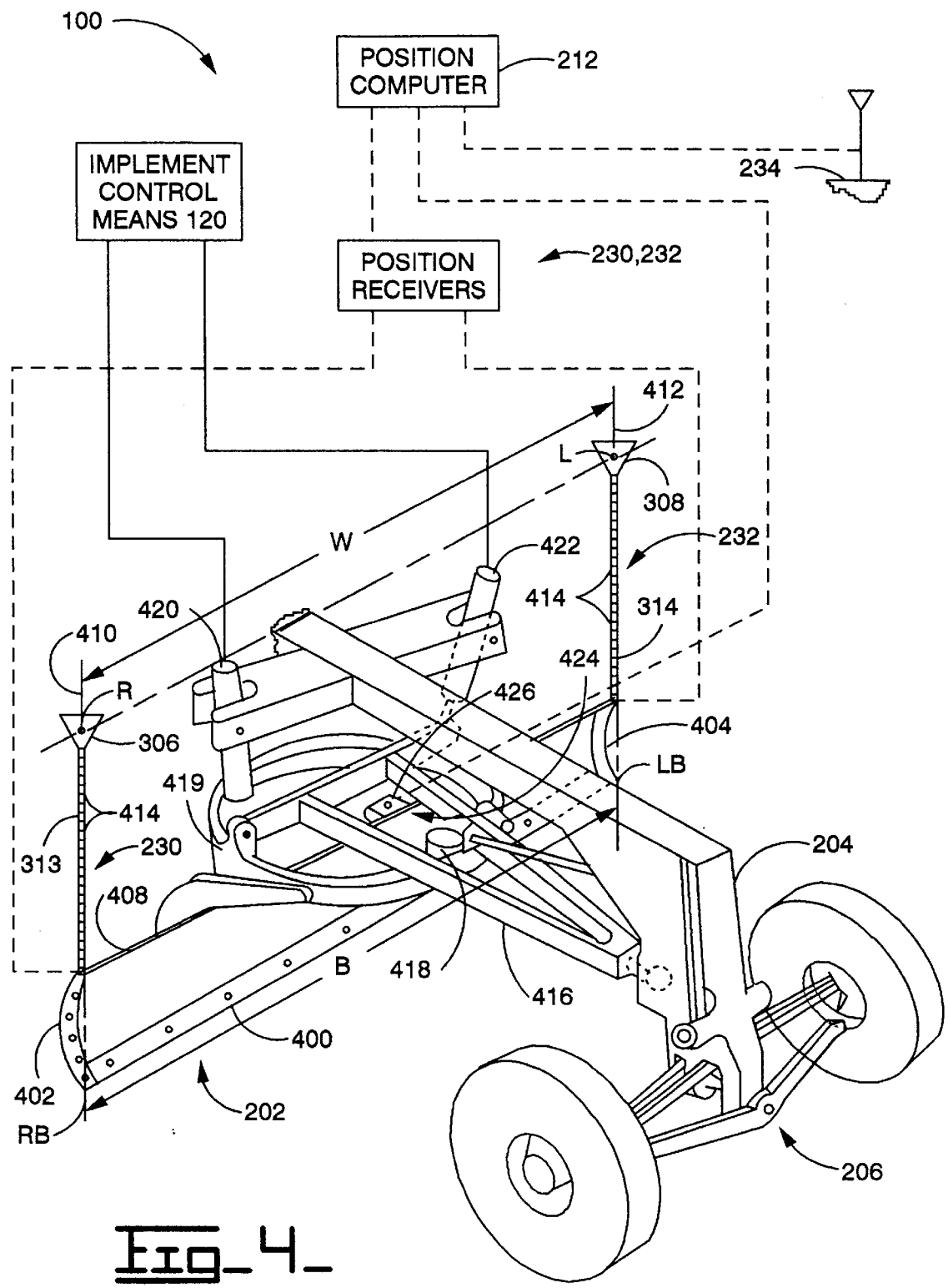
Fig_4

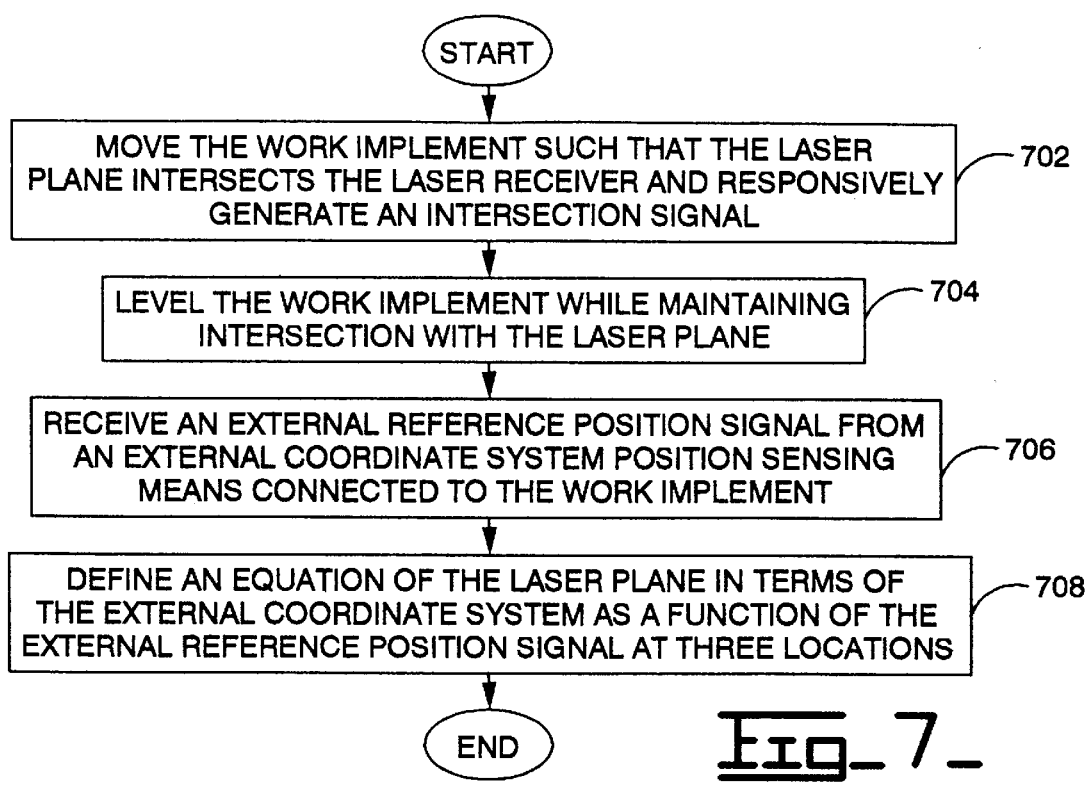
Fig_7_
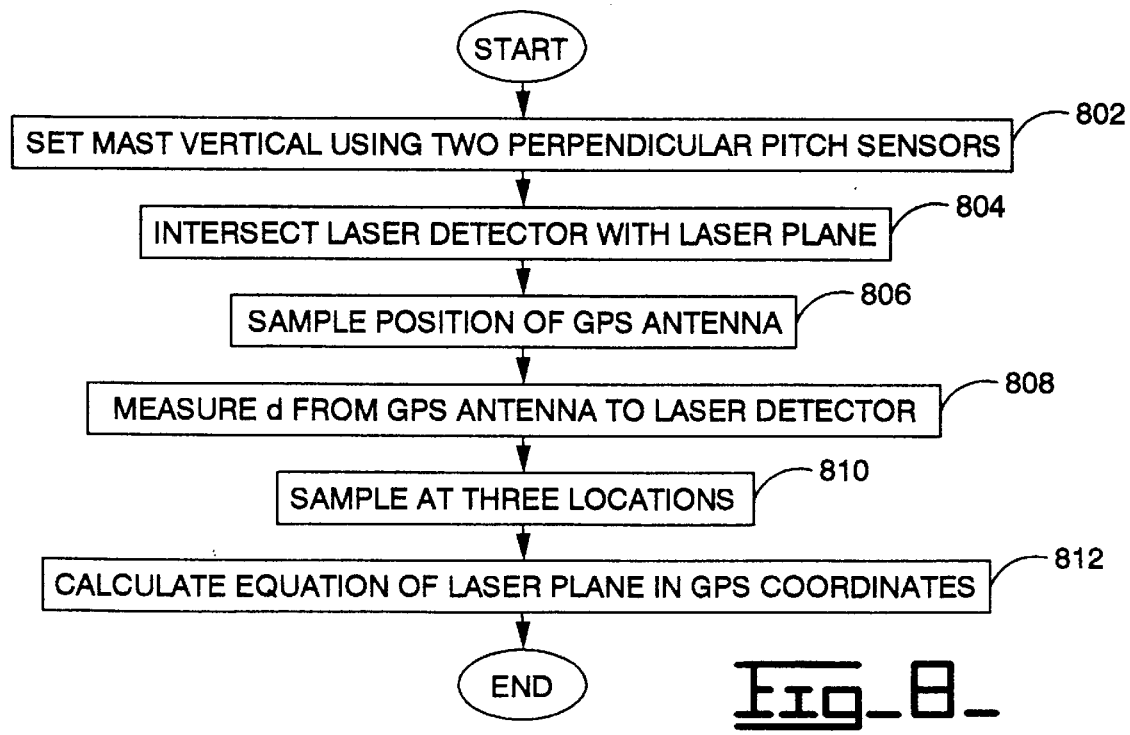
Fig_8_

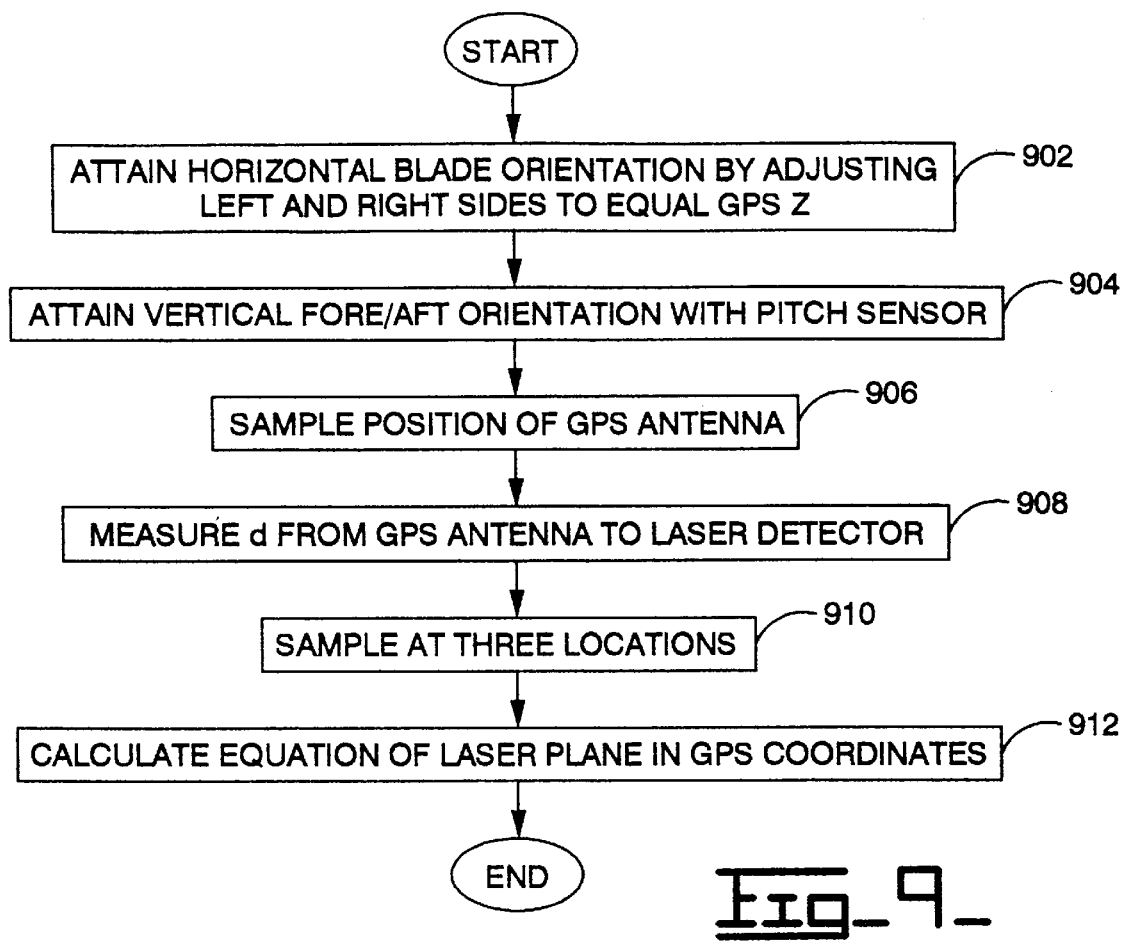
Fig_9_
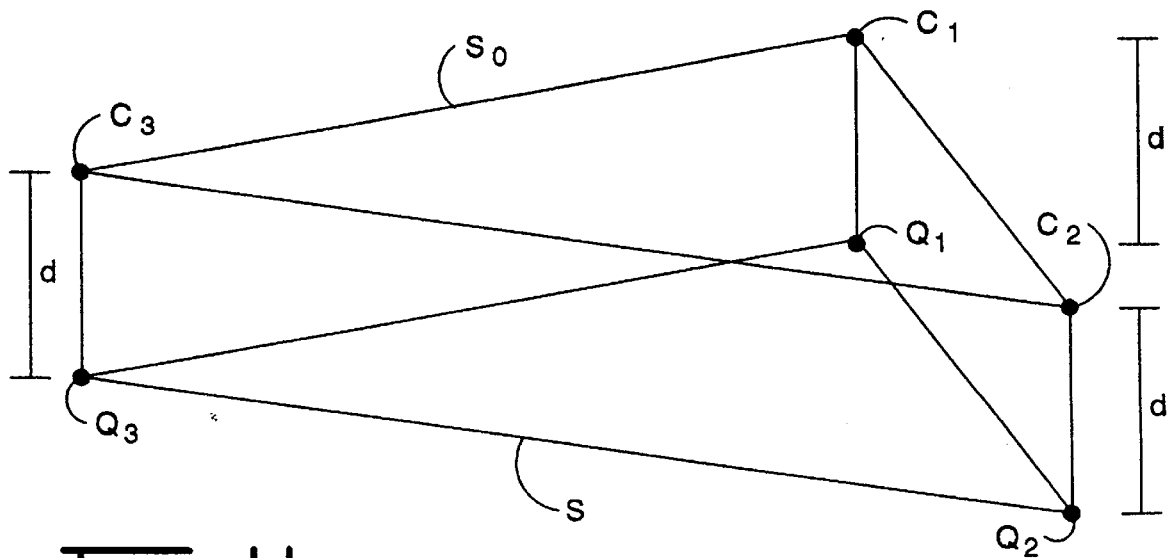
Fig_11_

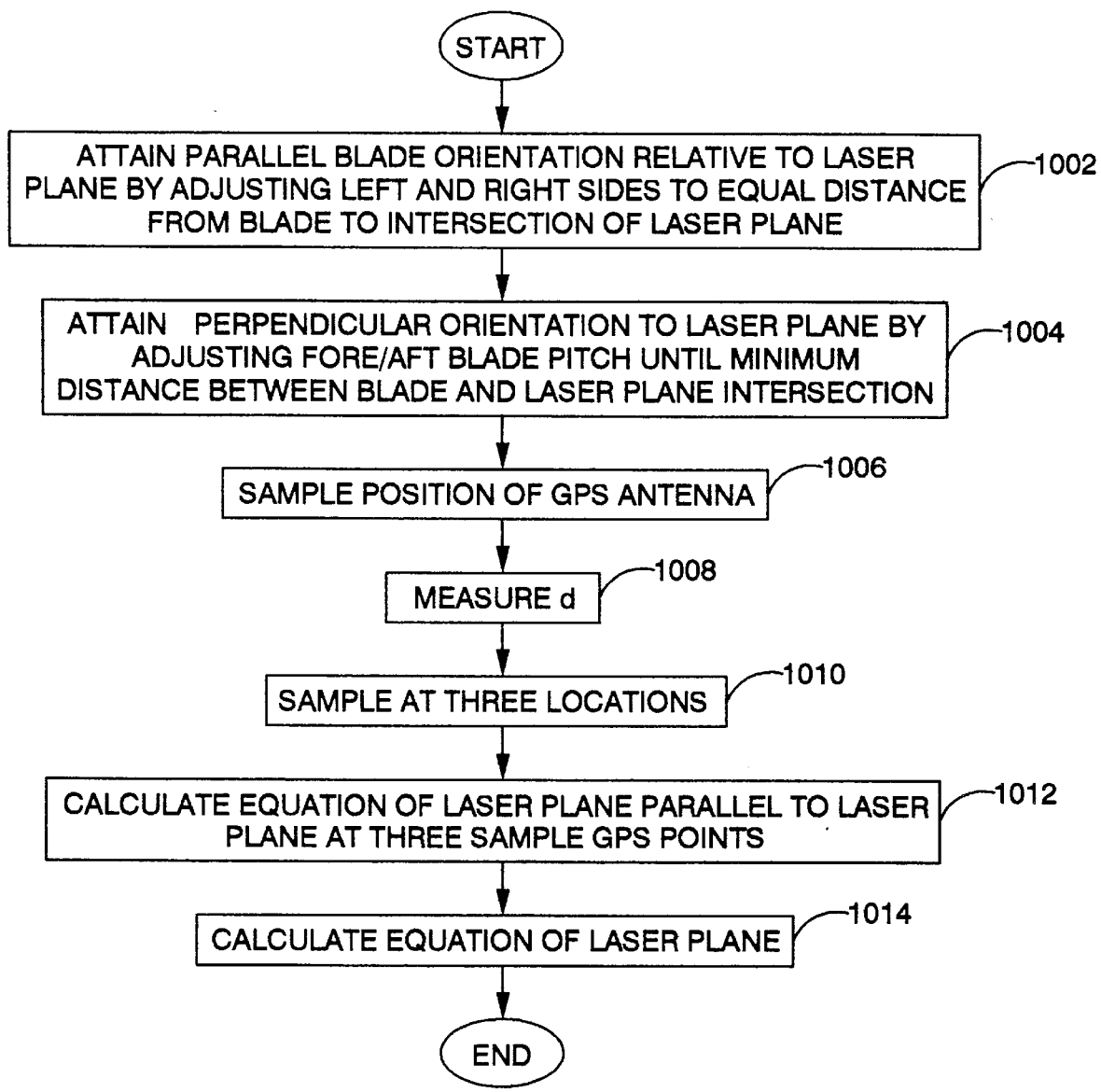
Fig-10-

METHOD AND SYSTEM FOR DETERMINING THE RELATIONSHIP BETWEEN A LASER PLANE AND AN EXTERNAL COORDINATE SYSTEM

TECHNICAL FIELD

This invention relates to a method and system for determining the coordinates of a laser plane and more particularly to a method and system for determining the coordinates of a laser plane with respect to the coordinates of an external coordinate system.

BACKGROUND ART

Machines, for example, motor graders, dozers, compactors, pavers, and profilers to name just a few, are used for geographic surface altering operations. Such machines typically operate at construction sites which were previously manually surveyed, and staked according to construction site plans. During the process the construction site is frequently checked in order to confirm that the processed site meets the design specifications. This process requires large amounts of manual labor, much of which is performed by highly trained personnel. Further, the machine operator must be highly trained in order to obtain the degree of accuracy required.

Laser systems have been in use in some applications to provide a reference for the operator to follow. A laser beam emitted by a laser transmitter positioned at a surveyed location on the site is swept over the site. This establishes a laser plane. A receiver on the machine receives the laser beam and indicates to the operator the elevational position of the beam relative to a location on the machine, such as the machine or implement. This information is used by the machine operator for machine controlling purposes. An example of one such system is shown in U.S. Pat. No. 4,807,131 dated Feb. 21, 1989, to Philip M. Clegg. This patent discloses measuring the elevational position of the grading blade relative to the laser plane and displaying on a monitor parameters such as target elevation, actual elevation, and an allowable range of error so that the operator can, in one mode of operation, adjust the blade position to be within tolerance of the target location.

Implements are normally adjustably connected to the machine frame so that the slope, pitch, and elevation of the work implement can be varied relative to the machine. When the laser receiver is mounted on the machine frame, any change in the position of the work implement relative to the frame causes an unaccounted for change in the position of the work implement relative to the laser plane and the receiver. The information therefore provided to the operator is less than desirable and may not be used to any significant advantage. Placing a single laser receiver on the work implement eliminates this problem to the extent that the laser receiver moves with the work implement and is related to work implement position. However, any changes in tilt, pitch or rotation of the work implement relative to the laser plane are not compensated for and therefore the information provided is still not accurate. Providing a pair of laser receivers on the implement would improve position determining capabilities but would not enable the slope of cut of the work implement to be accurately determined.

Systems are known which use a constellation of satellites and a special receiver to determine by triangulation the position of a machine (actually the position of the antenna of the receiver) in three space coordinates relative to a work site coordinate system. Such systems are normally referred to as kinematic global positioning systems (GPS). Historically, such systems have not been widely accepted since the accuracy of position determination was less than satisfactory for certain applications. Further, slow processing time reduced the commercial feasibility of determining machine position in realtime. Over the past few years the accuracy of position determination has been improved and the speed of processing has been increased. Thus, the potential to determine the realtime position of a machine is now feasible for an assortment of applications including, for example, geographic surface altering machines.

It is desirable to utilize a global positioning system to determine the realtime position of the work implement, for example, the cutting edge of a geographic surface altering implement. By placing a GPS antenna on the work implement it would appear that the location of the cutting edge could be measured. However, after a closer look, the inability to deal with the dynamics of the work implement and accurately accommodate variations in work implement orientation relative to the frame makes such a modification unlikely.

Any GPS antenna mounted on a work implement must be spaced from the cutting edge because of the harsh environment in which the implement operates. Since the GPS receiver determines the position of the antenna of the receiver in space and not the position of the cutting edge, any variations in the orientation of the work implement, such as discussed above, reduces the possibility of being able to accurately determine the cutting edge position. For at least the above reasons placement of a GPS antenna on the work implement would not be considered.

In some applications the accuracy of determining the coordinate position of a work implement relative to a work site using a GPS receiver is less than required to meet acceptable standards. The measured accuracy in the elevational direction of the site coordinate system is particularly important in applications where the end product is a finished surface, for example, a road way surface. Attempts to address this problem are being made but have not resulted in a GPS system with sufficient accuracy.

It is desirable to provide a control system that enables the work implement to be placed at a selected position at which a desired slope of cut is obtained. However, due to the dynamics of machine operation, the slope of cut changes as the machine moves. Further, blade movement such as rotation, pitch and tilt and the like affect the slope of cut of the work implement. Today, the machine operator must continuously adjust the work implement position to maintain the desired slope of cut. To do so requires a substantial amount of skill. Even the best machine operators have difficulty in accurately maintaining the slope of cut at the desired angle. To date there have been no successful solutions to this problem.

The present invention is directed to overcoming one or more of the problems as set forth above.

DISCLOSURE OF THE INVENTION

In one aspect of the present invention, a method for determining the relationship between a laser plane and an external coordinate system using a mobile machine with a work implement is provided. The method includes the steps of moving the movable implement such that the laser plane intersects the laser receiver and responsively generating an intersection signal, receiving an external reference position signal from an external coordinate system position sensor connected to the work implement, leveling the work implement while maintaining intersection with the laser plane, and defining an equation of the laser plane in terms of the external coordinate system as a function of the external reference position signal.

In another aspect of the present invention, a system for determining the relationship between a laser plane and an external coordinate system using a mobile machine with a movable implement is provided. The system includes sensors for determining the position of the work implement in external coordinate system coordinates and a laser detector for detecting intersection with the laser plane. A microprocessor based controller defines an equation of the laser plane in terms of the external coordinate system as a function of the external reference position signal.

BRIEF DESCRIPTION OF THE DRAWINGS

FIG. 1 is a diagrammatic block diagram of a system for determining the position of a work implement;

FIG. 3 is a diagrammatic block diagram of an apparatus for determining the position of a work implement and a control system for subsequently controlling the position of the work implement;

FIG. 4 is a diagrammatic schematic of the apparatus of FIG. 3 showing the control system in greater detail;

FIG. 5 is a diagrammatic side view of the work implement having first and second position receiving means mounted thereon;

FIG. 6 is a diagrammatic view of the implement and receiving means of FIG. 5 shown pitched at an angle θ in a local coordinate system;

FIG. 7 is a flow diagram illustrating a method to determine the relationship between a laser plane and an external coordinate system;

FIG. 8 is a flow diagram illustrating a method of a first embodiment of the present invention;

FIG. 9 is a flow diagram illustrating a method of a second embodiment of the present invention;

FIG. 10 is a flow diagram illustrating a method of a third embodiment of the present invention; and FIG. 11 is a diagrammatic illustration of two parallel planes separated by a distance, d.

BEST MODE FOR CARRYING OUT THE INVENTION

Figure 2:
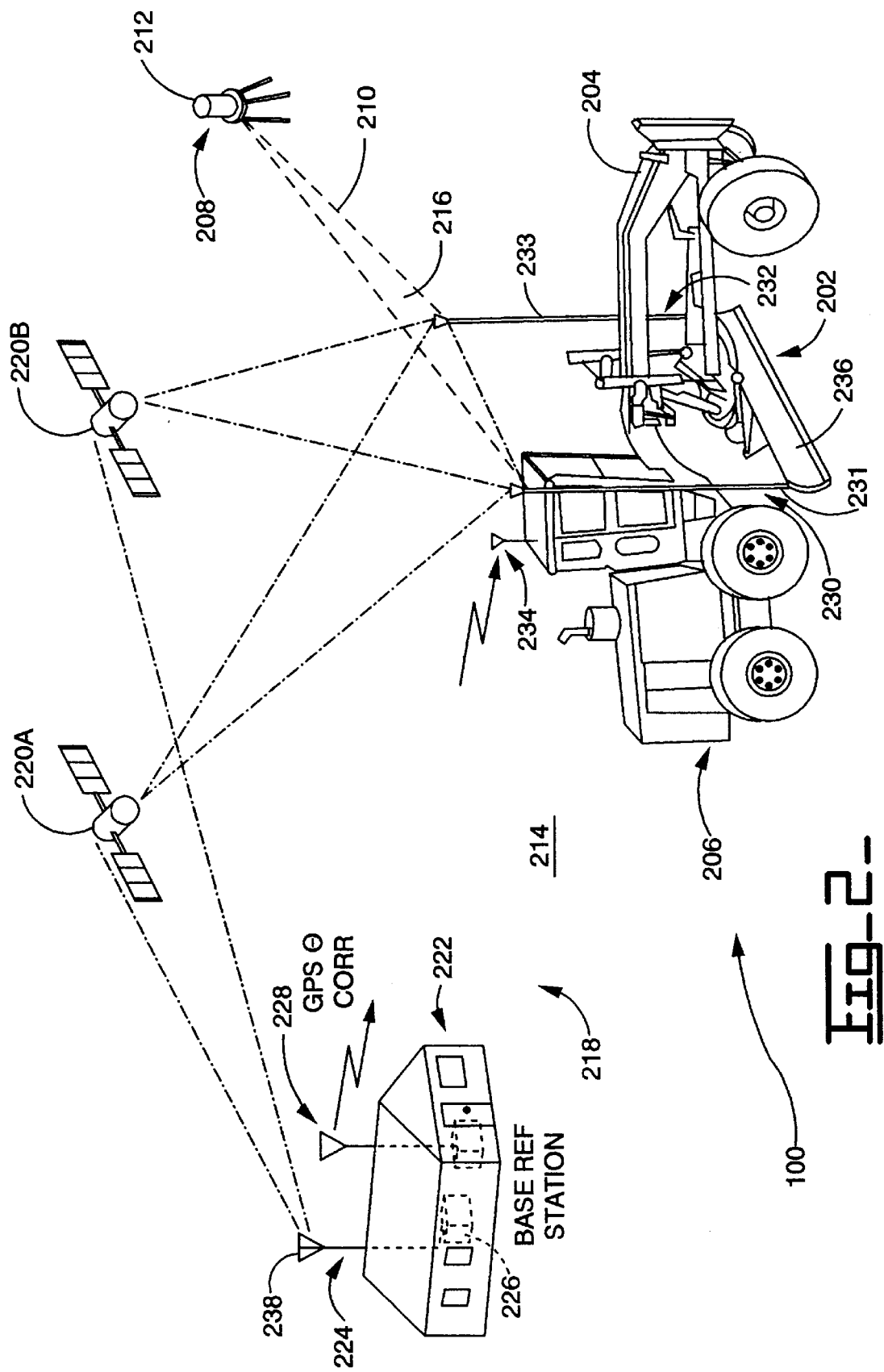
FIG. 2 is a diagrammatic isometric drawing of an embodiment of the present invention showing a combined laser and kinematic global positioning system for a geographic altering machine having a work implement.

With reference to the drawings and particularly FIGS. 1 and 2, the present invention provides a method and system 100 for determining the relationship between a laser plane 216 and an external coordinate system using a mobile machine 206 with a movable implement 202.

An external coordinate system position sensing means 102 determines the position of the work implement 202 in external coordinate system coordinates and responsively produces an external reference position signal. In the preferred embodiment, the external coordinate system position sensing means 102 includes at least one external coordinate system position sensor 104.

A laser detecting means 106 detects intersection with the laser plane 216 and responsively produces an intersection signal. In the preferred embodiment, the laser detecting means 106 includes at least one laser detector 108.

A controlling means 110 receives the intersection signal and the external reference position signal and responsively defines an equation of the laser plane 216 in terms of the external coordinate system as a function of the external reference position signal. In the preferred embodiment, the controlling means 110 includes a microprocessor-based controller 112.

The controller 112 receives signals from the external coordinate system position sensing means 102 and the laser detection means 106 during a setup routine performed by an operator and responsively determines the relationship between the laser plane 216 and the external coordinate system.

In the preferred embodiment, the relationship is embodied as a formula representing the laser plane 216 expressed in the external coordinate system.

With reference to FIGS. 2 through 5 in the preferred embodiment, the system 100 is further adapted to determine the position of a work implement 202 of the mobile machine 206 in external coordinates and/or control the work implement 202. The position of the mobile machine 206 and the work implement 202 may be displayed to the operator via a display screen (not shown).

The work implement 202, shown as an earth working blade 236, is controllably movably mounted on a frame 204 of a geographic surface altering machine 206, shown as a motorgrader. It is to be noted that other machines such as dozers, scrapers, compactors, pavers, profilers and the like, equipped with suitable surfacing altering implements, are equivalents and considered within the scope of the invention.

The system 100 includes a laser scanner 208. The laser scanner 208 is adapted to deliver a low intensity laser beam 210 swept about a substantially vertical axis 212. The laser scanner 208 is positioned at a preselected coordinate location (x,y) within a surveyed area hereinafter referred to as a work site 214. The swept laser beam 210 defines a plane 216 at a predetermined elevational position along the vertical axis 212 and establishes an accurate elevational coordinate position z.

The system 100 also includes a global positioning system (GPS) 218. The GPS 218 includes a constellation of satellites, two of which are shown at 220A and 220B. Preferably, four satellites in "view" of the machine 206 are selected because of favorable geometry for triangulation.

The global positioning system 218 includes a base station 222 and a reference receiving means 224 connected to the base station 222. The reference receiving means 224 is adapted to receive electromagnetic radiation delivered from a plurality of locations and responsively produce reference positioning signals. The reference receiving means 224 includes a GPS reference receiver 226. The base station 222 is located at a known, fixed position, at the work site 214. A transceiver 228 at the base station 222 and a transceiver 234 on the machine 206 provides an RF communication link between the machine 206 and the base station 222 over which reference position data is transferred. A base station processor (not shown) is used in determining the position of the base station 222 relative to the center of the earth.

The external coordinate system position sensing means 102 includes a first receiving means 230 for receiving electromagnetic radiation delivered from a plurality of remote locations and responsively producing a first position signal and a second receiving means 232 for receiving electromagnetic radiation delivered from said plurality of remote locations and responsively producing a second position signal.

As best seen in FIGS. 2 and 3, the first receiving means 230 is connected at a first preselected location on a first mast 231 mounted on the work implement 202 and the second receiving means 232 is connected at a second preselected location on a second mast 233 mounted on the work implement 202. The first receiving means 230 includes a first GPS receiver 302 and the second receiving means 232 includes a second GPS receiver 304. The first and second GPS receivers 302,304 each have an antenna 306,308 and a preamplifier (not shown). Position signals received by the first and second antennas 306,308 are amplified and delivered to the first and second GPS receivers 302,304. The first and second GPS receivers 302,304 decode the navigation signals and produce a pseudorange and a satellite position for each selected satellite. A processing means 310, including a position computer 312, calculates the position of the first and second GPS receivers 302,304 based on the pseudorange and satellite positions. In particular, the first and second GPS receivers 302,304 determine the position of a receiving point location R, L on the first and second antennas 306,308, respectively. The receiving points R, L are the effective center of receipt of the GPS signals and are used in subsequent calculations. Global positioning systems such as this are known to those skilled in the art and will therefore not be discussed in any greater detail.

The implement 202, as shown in FIG. 4, includes an earth grading blade 236, having first and second sides 402,404, a cutting edge 400 and an upper edge 408. For reasons of simplicity, the following discussion will be with respect to this particular earth working blade. However, it is to be recognized that other implements may replace the blade without departing from the spirit of the invention. The first antenna 306 is mounted on the blade 236 adjacent the first side 402 and the second antenna 308 is mounted on the blade 236 adjacent the second side 404. The receiving points R, L are spaced a preselected distance W apart. As shown, the particular distance W is substantially equal in magnitude to a distance between the first and second blade sides 402,404. The first and second receiving points R, L are positioned with respect to first and second point locations RB, LB which preferably lie along the cutting edge 400 of the blade 236. The first and second point locations RB, LB are preferably at first and second corners of the blade 236, at the intersection of the first and second sides and the cutting edge 400, and a distance B apart. The distance B is preferably equal to distance W. Placing the first and second antennas 306,308 (receiving points R, L) and the first and second points RB, LB at these locations simplifies three dimensional space transformation calculations between the first and second receiving points R, L and the first and second point locations RB, LB of the blade 236. Preferably, the first and second receiving means 230,232 are located along first and second axial lines 410,412 extending perpendicular to the cutting edge 400 and parallel to each other. It should be recognized however that other locations may be selected without departing from the spirit of the invention.

Referring to FIGS. 2 and 3, the first and second receiving means 230,232 include first and second laser receivers 313,314 connected to the blade 236 at the aforementioned first and second predetermined spaced apart locations. Preferably, the first and second laser receivers 313,314 are at the location of the first and second antennas 306,308, respectively. As best seen in FIG. 4, the first and second antennas 306,308 are mounted on one end portion of the first and second laser receivers 313,314, respectively, and the other end portion of the laser receivers 313,314 are connected to the blade 236 at the upper edge 408. The laser receivers 313,314 are incremental laser receivers and include a plurality of linearly aligned photo receptors 414 and associated circuitry (not shown) for delivering an output signal representative of the particular receptor illuminated. The construction of laser receivers of this type are well known in the art and will therefore not be discussed in any greater detail. The first and second laser receivers 313,314 are provided to improve the accuracy of the implement position measurement in the elevational direction and to supplement the measurement obtained from the global positioning system 218. The first and second laser receivers 313,314 are connected to the position computer 312. The laser receivers 313,314 deliver output signals to the position computer 312 and the position computer 312 determines the elevational coordinate position z of the blade 236 in three dimensional space relative to the particular work site 214. The first and second lines 410,412 extend along the length of the first and second laser receivers 313,314 and pass through the receiving points R and L.

Referring to FIG. 2, the reference receiver 226, located at the base station 222, receives signals from the constellation of GPS satellites. The base station computer (not shown) which is connected to the receiver 226 determines the position of the receiver 226 (antenna 238) with respect to the center of the Earth. The reference receiver 226 is used to make a "differential global positioning system". The first and second GPS receivers 302,304 and the reference receiver 226 are commercially available and includes the antenna, preamplifier and receiver. The position computer 312 and base station computer include a commercially available microprocessors from Motorola, Inc., of Schaumburg, Ill.

Referring to FIGS. 4 and 5, the implement 202 is shown in greater detail. The blade 236 is movably connected to the frame 204 by a supporting mechanism 416. The supporting mechanism 416 includes a circle drive mechanism 502 having a selectively actuatable rotary drive motor 418 for rotating a circle 419 and the blade 236 connected thereto about an elevational axis located at the center of the circle 419 in a known manner.

As best seen in FIG. 4, the system 100 includes an implement control means 120 having first and second selectively actuatable fluid operated lift jacks 420,422 which are connected to and between the frame 204 and the supporting mechanism 416. The first and second lift jacks 420,422 are extensibly movable between first and second spaced apart positions and elevationally move the blade 236 relative to the frame 204. Simultaneous extension of the lift jacks 420,422 lowers the blade 236 and simultaneous retraction of lift jacks 420,422 raises the blade 236. Extension or retraction of either the first and second lift jacks 420,422, or extension of one of the first and second lift jacks 420,422 and retraction of the other of the lift jacks 422,420 results in tilting of the blade 236 relative to the frame 204 in directions transverse the direction of movement of the machine 206.

As shown in FIG. 5, a fluid operated tip jack 504 is connected to and between the supporting mechanism 416 and a bellcrank 506. The bellcrank 506 pivotally connects the blade 236 to the circle drive mechanism 502. The tip jack 504 is extensibly movable for tipping the bellcrank 506 about the pivotal connection. This results in tipping movement of the blade 236 in forward or rearward directions, as shown in phantom lines in FIG. 5, with the blade oriented transversely of the vehicle frame 204. It should be noted that the terms tip and pitch are used interchangeably and have the same meaning.

In the preferred embodiment, an orientation determining means 320 determines the orientation of the work implement 202 with respect to the ground surface. In the preferred embodiment, the orientation of the work implement 202 is characterized in terms of pitch ($\beta$) and tilt ($\alpha$).

In the preferred embodiment, the orientation determining means 320 includes a two dimensional bubble sensor 322. The two dimensional sensor 322 includes a casing filled with an electrically conductive fluid. A bubble or pocket of gas, e.g., air, is trapped within the casing. As the orientation of the work implement 202 changes, the location of the bubble moves within the casing. The electrical impedance across the sensor 322 varies with the location of the bubble and is proportional to the respective angles. The sensor 322 measures the electrical impedance across the casing on two perpendicular axes and responsively determines the pitch and tilt angles. A suitable 2-axis bubble sensor is available from Spectron Glass and Electronics Inc of Hauppauge, N.Y. as model no. SP50000. In an alternate embodiment, two single axis sensors, model no. L-212t may be used. Additionally, the present invention may alternately use a pendulum type sensor.

The position computer 312 determines a related current position $\hat{RB}$, $\hat{LB}$ of the first and second point locations RB,LB on the work implement 202 in a local coordinate system. The local coordinate system is a three dimensional coordinate system established relative to the frame 204 (supporting mechanism 416). As seen in FIG. 6, blade 236 is shown as being viewed from the second side 404 and looking down along the blade 236.

The processing means 310 receives the first and second position signals from the first and second receiving means 230,232 and determines first and second current coordinate positions L,R of the first and second receiving means 230,232, on a realtime basis, in a site coordinate system related to the work site 214 above. It is to be noted that the first and second signals may include the laser position signals as indicated above when additional accuracy in the elevational direction is required. Since the laser determined elevational position is more accurate than the GPS determined elevational position, the processing means 310 preferably disregards the GPS elevational component and uses the laser determined elevational position z.

The processing means 310 is adapted to determine the position of the endpoints of the work implement 202 in terms of external coordinates, i.e., GPS coordinates. A processing means 310 adapted to perform such function is disclosed in U.S. application Ser. No. 8/493,188, titled APPARATUS AND METHOD OF DETERMINING THE POSITION OF A WORK ELEMENT, filed Jun. 20, 1995 by Henderson, which is incorporated herein by reference.

Returning to FIG. 3, the processing means 310 includes a database computer 316 with memory. The database computer 316 is connected to the position computer 312. The database computer 316 receives signals from the position computer 312 and updates in real time the current coordinate position of the first and second point locations RB, LB on the blade 236 within the work site 214 and the % slope of the work implement 202 as the machine 206 traverses the work site 214. The database computer 316 is also connected to a transceiver 103. The transceiver 103 is mounted on the machine 206 and in radio frequency transmission communication with the transceiver 228 at the base station 222. The transceiver 228 is connected to a landbase computer (not shown) located at the base station 222. The transceiver 228 communicates with the transceiver 103 and transfers data between the database computer 316 and the landbase computer. Data such as machine position, implement position, changes to the earth's topography, the % slope of the work implement 202, and the like are transmitted therebetween. For example, the % slope of the work implement 202, and changes thereof caused by the dynamics of operation of the machine 206 as the machine 206 traverses the work site 214, is updated in real time in the position computer 312 located on the machine 206, based on the tracking of the first and second points RB, LB in the site coordinate system. Information such as this is transmitted to update the landbase computer.

A monitor 318 of any suitable commercially available construction for example, a liquid crystal display, a cathode ray tube, or other suitable device capable of displaying information, is connected to the database computer 316. The database computer 316 delivers signals to the monitor 318 which displays pictorially or graphically the current position of the blade 236 relative to the work site 214. The monitor 318 also displays, in either two or three dimensions, or numerically the actual and desired cross slope of cut of the work implement 202.

Digitized plans or models of the actual work site, as previously determined by a topographic survey, may be loaded into the database computer 316. A digitized plan or model of the desired work site, as drafted by an architect, may also be loaded into the database computer 316. The actual work site data is updated in real time based on the position of the first and second point locations RB, LB, as determined above. The database being dynamic facilitates realtime tracking of the first and second point locations RB, LB and the area of the earth's surface being altered by the blade 236 as the blade 236 traverses the work site 214. A responsive signal is delivered from the database computer 316 to the monitor 318 and the current position of the blade 236, the actual work site, as altered, the actual and desired k slope, and the desired work site elevation is displayed singularly or in combination on the monitor 318, as requested by the machine operator.

The implement control means 120 is preferably adapted to control actuation of the work implement 202 in manual and/or automatic modes. An implement control means 120 for performing such function is disclosed in U.S. application Ser. No. 8/492,644, titled SLOPE OF CUT CONTROL SYSTEM, filed Jun. 20, 1995 by Henderson, which is incorporated herein by reference.

In order to either control the work implement 202 or determine the position of the work implement 202 in the external coordinate system while using a combination of the GPS and laser plane systems, the relationship between the external coordinate system and the laser plane must be determined.

Industrial Applicability

With reference to FIG. 7, operation of the setup routine to determine the relationship between the laser plane and the external coordinate system will now be discussed. The setup routine may be entered automatically upon startup of the machine 206 or at the request of an operator through an input button or like device. The operator is then prompted to perform various acts as described below.

In a first control block 702, the work implement 202 is moved by the operator such that the laser plane 216 intersects one of the laser detectors/receivers 313,314.

In a second control block 704, the work implement 202 is then leveled as explained below.

Then a GPS position reading from one of the GPS receivers 302,304 is sampled in a third control block 706.

The above three steps are performed at three different locations of the work site 214.

In a fourth control block 708, an equation of the laser plane 216 is defined in terms of the external coordinate system as a function of the GPS position at the three locations of the work site 214.

In a first embodiment, the equation of the laser plane 218 is determined using data from the GPS receiver 302,304 and the laser detector 313,314 of one of the receiving means 230,232 and the two pitch sensors 322.

The first embodiment of the setup routine is illustrated in FIG. 8.

In a fifth control block 802, the masts 231,233 are set vertical with respect to the earth using the two dimensional bubble sensors 322. This may be done automatically or the sensor output may be displayed to the operator, allowing the operator to manually adjust the work implement 202 until level.

In a sixth control block 804, the operator is instructed to move the work implement 202 vertically until intersection with the laser plane 216 occurs.

In a seventh control block 806, with the work implement 202 level and the laser plane 216 being intersected, the GPS position is sampled.

In an eighth control block 808, the distance from the GPS antenna 306,308 to the laser plane 216 is determined as a function of where the laser detector 313,314 intersects with the laser plane 216.

In a ninth control block 810, three such GPS locations are measured. Two of these locations may be determined using the first and second GPS receivers 302,304 while the machine 206 and the work implement 202 are at the same location. For the third GPS location, the machine 206 may be moved to a new position.

Using the three sampled GPS positions an equation of the laser plane in GPS coordinates is calculated in a tenth control block 812.

In a second embodiment, the setup routine is accomplished using the two GPS receivers 302,304, one of the laser receivers 313,314, and the pitch sensor 322. With reference to FIG. 9, the second embodiment of the setup routine will now be discussed.

In an eleventh control block 902, horizontal blade orientation is obtained by adjusting the right and left sides of the work implement 202 to equalize the z reading of the GPS receivers 302,304. This may either be done automatically or be done by the operator. If the latter is the case, then the z readings of the GPS receivers 302,304 would be displayed to the operator to allow the operator to manually adjust the implement 202.

In a twelfth control block 904, vertical orientation of the work implement 202 is obtained using the pitch sensor 322. As stated above, this may be accomplished automatically or manually by the operator.

In a thirteenth control block 906, the GPS reading is sampled.

In a fourteenth control block 908, the distance d from the GPS antenna 306,308 to the laser detector 313,314 is measured.

In a fifteenth control block 910, GPS readings are taken at two other locations.

In a sixteenth control block 912, the equation of the laser plane 216 is calculated in GPS coordinates using the equations above.

In the first and second embodiments, the masts 231,233 are set vertical with respect to the earth. The x and y GPS coordinates determined at these points are the same for the laser plane intersection point. The z coordinate determined by the GPS antenna 306,308 becomes z–d at the laser plane intersection point. Thus, for the first and second embodiments, a GPS coordinate of x,y,z corresponds to a laser plane coordinate of x,y,z–d. An equation for the laser plane 216 is easily determined by substituting the above laser plane coordinates for the known GPS coordinates.

In the first and second embodiments, the work implement 202 is first leveled with respect to the external coordinate system. In the following or third embodiment, the work implement 202 is first leveled with respect to the laser plane 216.

With reference to FIG. 10, the third embodiment will now be discussed. In the third embodiment, the setup routine is performed using a GPS receiver 302,304 and the two laser detectors 313,314.

In a seventeenth control block 1002, parallel work implement orientation is obtained relative to the laser plane 216 by adjusting the left and right sides of the work implement 202 to equalize the distance from the work implement 202 to the intersection point on the laser detectors 313,314.

In an eighteenth control block 1004, perpendicular blade orientation relative to the laser plane 216 is obtained by adjusting fore/aft blade pitch until a minimum distance between the work implement 202 and the laser plane intersection is obtained.

In a nineteenth control block 1006, a GPS reading is sampled.

In a twentieth control block 1008, the distance d between the laser plane intersection and GPS is determined.

In a twenty-first control block 1010, the GPS position and d for two other points is determined.

In a twenty-second control block 1012, the equation of the plane containing the three sampled GPS points is determined in a manner as shown below.

In a twenty-third control block 1014, the equation of the laser plane 216 is calculated using the GPS plane determined above and the distance d between the laser plane 216 and the determined GPS plane.

With reference to FIG. 11, $C_1$, $C_2$, $C_3$ represent the three sampled GPS locations and $S_0$ represents the plane defined by $C_1$, $C_2$, and $C_3$.

The distance between the GPS antenna 306,308 and the laser plane 216 at the measured locations is represented by d.

The laser plane 216 is represented by S. $Q_1$, $Q_2$, and $Q_3$ are the three points on the laser plane 216 defined by $C_1$, $C_2$, and $C_3$ and d.

Thus, given $C_1$, $C_2$, $C_3$, d and that S is parallel to $S_0$, the equation of the laser plane 216 is defined by an equation having the form:

$$A_0 X + B_0 Y + C_0 Z + D_1 = 0 \qquad \text{Equation 1}$$

$A_0$, $B_0$, and $C_0$ define a vector $\bar{n}_0$ which is normal to $S_0$.

$$\bar{n}_0 = (A_0, B_0, C_0). \qquad \text{Equation 2}$$

Then a unit vector $\bar{u}_0$ is determined:

$$\bar{u}_0 = \frac{\bar{n}_0}{|\bar{n}_0|} \qquad \text{Equation 3}$$

Then, the three points used to define the laser plane 216 are determined by the equations:

$$\bar{Q}_1 = \bar{C}_1 + d_{sep}(\bar{u}_0) \qquad \text{Equation 4}$$

$$\bar{Q}_2 = \bar{C}_2 + d_{sep}(\bar{u}_1) \qquad \text{Equation 5}$$

$\overline{Q}_3 = \overline{C}_3 + d_{sep}(\overline{u}_0)$  Equation 6

Given the three points in the laser plane 216, the laser plane equation (Equation 1) can be determined. $D_1$ is set to an arbitrary number, e.g., In matrix form $A_0$, $B_0$, and $C_0$ can be determined by the equations:

$$T * U = V \quad \text{Equation 7}$$

$$\begin{bmatrix} X_{Q_1} & Y_{Q_1} & Z_{Q_1} \\ X_{Q_2} & Y_{Q_2} & Z_{Q_2} \\ X_{Q_3} & Y_{Q_3} & Z_{Q_3} \end{bmatrix} \begin{bmatrix} a \\ b \\ c \end{bmatrix} = \begin{bmatrix} -1 \\ -1 \\ -1 \end{bmatrix} \quad \text{Equation 8}$$

$$U = T'V \quad \text{Equation 9}$$

$$\begin{bmatrix} a \\ b \\ c \end{bmatrix} = \begin{bmatrix} X_{Q_1} & Y_{Q_1} & Z_{Q_1} \\ X_{Q_2} & Y_{Q_2} & Z_{Q_2} \\ X_{Q_3} & Y_{Q_3} & Z_{Q_3} \end{bmatrix}^{-1} \begin{bmatrix} -1 \\ -1 \\ -1 \end{bmatrix} \quad \text{Equation 10}$$

Other aspects, objects and advantages of the present invention can be obtained from a study of the drawings, the disclosure and the appended claims.

We claim:

1. A method for determining the relationship between a laser plane and an external coordinate system using a mobile machine with a work implement, comprising;

moving the work implement such that the laser plane intersects a laser detecting means mounted on the work implement and responsively generating an intersection signal;

receiving an external reference position signal from an external coordinate system position sensing means connected to the work implement, respectively;

leveling said work implement while maintaining intersection with the laser plane; and, defining an equation of the laser plane in terms of the external coordinate system as a function of the external reference position signal.

2. A method as set forth in claim 1, further comprising the step of leveling said work implement with respect to one of the external coordinate system and the laser plane.

3. A method as set forth in claim 1, wherein the step of leveling said work implement further comprises the step of leveling said work implement with respect to the laser plane.

4. A method as set forth in claim 3, wherein the step of leveling said work implement further comprises:

determining a perpendicular work implement orientation relative to the laser plane; and determining a parallel work implement orientation relative to the laser plane.

5. A method as set forth in claim 1, wherein the step of leveling said work implement further comprises the step of leveling said work implement with respect to the external coordinate system.

6. A method as set forth in claim 5 wherein the step of leveling said work implement further comprises the steps of:

determining a vertical blade orientation relative to the external coordinate system; and determining a horizontal blade orientation relative to the external coordinate system.

7. A method, as set forth in claim 1, further comprising the steps of:

receiving a plurality of said intersection signals and a plurality of said external reference position signals comparing said plurality of said intersection signal and said plurality of said external reference position signals.

8. A method, as set forth in claim 7, wherein the step of comparing said plurality of said intersection signals and said external reference position signals includes determining a constant offset between an elevation component of said intersection signals and said external reference position signals.

9. A method, as set forth in claim 7, wherein the step of comparing said plurality of said intersection signals and said external reference position signals includes determining a variable offset between an elevation component of said intersection signals and said external reference position signals.

10. A system for determining the relationship between a laser plane and an external coordinate system using a mobile machine with a work implement, comprising:

external coordinate system position sensing means for determining the position of the work implement in external coordinate system coordinates and responsively producing an external reference position signal;

laser detecting means for detecting intersection with the laser plane and responsively producing an intersection signal; and controlling means for receiving said intersection signal and said external reference position signal and responsively defining an equation of the laser plane in terms of the external coordinate system as a function of the external reference position signal.

* * * * *

UNITED STATES PATENT AND TRADEMARK OFFICE
CERTIFICATE OF CORRECTION

PATENT NO. : 5,935,183
DATED : August 10, 1999
INVENTOR(S) : William C. Sahm et al.

It is certified that error appears in the above-identified patent and that said Letters Patent is hereby corrected as shown below:

On column 1 at line 5, in a separate paragraph after the title, "METHOD AND SYSTEM FOR DETERMINING THE RELATIONSHIP BETWEEN A LASER PLANE AND AN EXTERNAL COORDINATE SYSTEM", forming a new paragraph insert, -- The invention described herein was made in the performance of work under NASA Cooperative Agreement No. NCC2-9007, Contract No. TRP SOL93-29 and is subject to the provisions of Section 305 of the National Aeronautics and Space Act of 1958 (42 U.S.C. 2457). The Government has certain rights to this invention.--.

Signed and Sealed this

Twenty-sixth Day of September, 2000

*Attest:*

Q. TODD DICKINSON

*Attesting Officer*    *Director of Patents and Trademarks*